US009072134B2

(12) United States Patent
Welten et al.

(10) Patent No.: US 9,072,134 B2
(45) Date of Patent: Jun. 30, 2015

(54) CONFIGURABLE LIGHTING DEVICES UNDER BROADCAST CONTROL

(75) Inventors: Petrus Johannes Maria Welten, Oss (NL); Hubert Johan Marie Robert Van Doorne, Waalre (NL)

(73) Assignee: ELDOLAB HOLDING B.V., Son En Breugel (NL)

( * ) Notice: Subject to any disclaimer, the term of this patent is extended or adjusted under 35 U.S.C. 154(b) by 592 days.

(21) Appl. No.: 12/937,512

(22) PCT Filed: Apr. 9, 2009

(86) PCT No.: PCT/NL2009/000087
§ 371 (c)(1), (2), (4) Date: Dec. 28, 2010

(87) PCT Pub. No.: WO2009/126024
PCT Pub. Date: Oct. 15, 2009

(65) Prior Publication Data
US 2011/0084628 A1 Apr. 14, 2011

Related U.S. Application Data

(60) Provisional application No. 61/043,613, filed on Apr. 9, 2008.

(51) Int. Cl.
*H04Q 5/22* (2006.01)
*H05B 37/02* (2006.01)

(52) U.S. Cl.
CPC ........ *H05B 37/0272* (2013.01); *H05B 37/0254* (2013.01)

(58) Field of Classification Search
None
See application file for complete search history.

(56) References Cited

U.S. PATENT DOCUMENTS

| | | | | |
|---|---|---|---|---|
| 4,980,806 | A | 12/1990 | Taylor et al. | |
| 6,175,201 | B1 | 1/2001 | Sid | |
| 6,236,170 | B1 * | 5/2001 | de Leijer | 315/316 |
| 6,545,586 | B1 | 4/2003 | Belliveau | |
| 6,655,817 | B2 * | 12/2003 | Devlin et al. | 362/233 |
| 6,895,288 | B1 * | 5/2005 | Shen | 700/83 |
| 7,186,003 | B2 | 3/2007 | Dowling et al. | |
| 7,245,228 | B2 * | 7/2007 | Fussinger et al. | 340/815.4 |
| 8,063,568 | B2 * | 11/2011 | Bergman et al. | 315/149 |
| 2002/0047628 | A1 * | 4/2002 | Morgan et al. | 315/291 |
| 2003/0001523 | A1 * | 1/2003 | Belliveau | 315/291 |
| 2003/0210167 | A1 * | 11/2003 | Weng | 341/176 |
| 2005/0063194 | A1 | 3/2005 | Lys et al. | |
| 2005/0248299 | A1 | 11/2005 | Chemel et al. | |
| 2005/0275559 | A1 | 12/2005 | Fussinger et al. | |
| 2008/0303688 | A1 * | 12/2008 | Newman, Jr. | 340/825.22 |
| 2010/0109850 | A1 * | 5/2010 | Kovach et al. | 340/10.32 |

* cited by examiner

*Primary Examiner* — Curtis King
(74) *Attorney, Agent, or Firm* — Browdy and Neimark, PLLC

(57) ABSTRACT

A control unit for controlling an illumination parameter of one or more light sources of a plurality of light sources is described. The control unit being arranged to —select the one or more light sources of the plurality of light sources, receive an input signal representing a required value of the illumination parameter for the selected one or more light sources, convert the input signal to a broadcast signal for the plurality of light sources; —enable the broadcast signal to be provided to the plurality of light sources thereby enabling the selected one or more light sources to comply with the required value of the illumination parameter.

28 Claims, 4 Drawing Sheets

CONFIGURABLE LIGHTING DEVICES UNDER BROADCAST CONTROL

The present invention relates to a control unit for controlling a configuration of light sources and a lighting system comprising a central control unit and a control unit.

BACKGROUND OF THE INVENTION

At present, lighting systems as applied in e.g. museums or shops comprise a plurality of light sources for illumination of different objects or locations. As an example, each object or location can be illuminated by a subset of the light sources of the lighting system. In order to control the subset of light sources or lighting devices, state of the art solutions use a lighting network whereby each of the controllable lighting devices can be addressed individually by a (master) control unit. This may results in a comparatively large number of channels to be individually addressed. As an example, assume a lighting system comprising 100 lighting devices (e.g. LED lighting units), each having 4 controllable colour groups. Addressing each colour group would thus require up to 4*100=400 lighting channels. Controlling, this many individually controllable channels may require a complex, voluminous, costly lighting controller or control unit. Updating such a large number channels, e.g. at a refresh rate of 20 ms may lead to a high data rate, as each 20 ms all lighting channels of the lighting devices are addressed by the controller or control unit.

A further disadvantage of the state of the art lighting controllers is that they are not redundant (prohibitive out of cost, volume, or complexity), which is an issue when used for general lighting which must be dependable and preferable redundant and easy to fix on potential device failures. Especially since the actual individual fixture setting are only known by the master lighting controller, this makes replacing this central control not a task that the average user can perform, prohibitive for general use of this kind of intelligent lighting (it generally now demands a skilled, informed and manual-reading user as well). The central control concept is also prohibitive for multi-location control due to the central (non-redundant) knowledge.

Furthermore, existing lighting protocols sending out 400 lighting channels also requires a bandwidth that is not only costly on the controller side, but also for each individual lighting device's network interface. High bandwidth network interfaces are also a significant size constraint in the existing lighting devices. The currently required bandwidth also rules out certain network interface physical layers that would be easier and more cost effective to implement than e.g. the RS485/DMX standard that is often used for this kind of application. A sufficiently lower bandwidth would enable reliable long distance power line communications. In addition, in principal high bandwidth communication also requires more transmit and receiver physical layer dissipation than a lower bandwidth solution would require.

Furthermore, it is often observed that such a centralised (master) control unit is often provided with a non-intuitive and complex user interface. In order to control/install or configure a group or subset of lighting devices for a particular situation (e.g. for illumination a particular location or object) the state-of-the-art centralized lighting network (i.e. controlled by a master control unit) often does not support, in a cost-effective manner, a way of local (e.g. standing at object or location of interest) setting or calibration of the required lighting effect. Preferably a user would like to be close to a certain scene/location for close observation and feedback for the required lighting effect or illumination conditions.

In view of the above, it is an object of the present invention to provide a control unit for controlling a configuration of light sources and a lighting system that overcomes, at least partly, one of the drawbacks of lighting system control units and lighting systems as known in the art.

SUMMARY OF THE INVENTION

According to an aspect of the invention, there is provided a control unit for controlling an illumination parameter of one or more light sources of a plurality of light sources, the control unit being arranged to

- select the one or more light sources of the plurality of light sources,
- receive an input signal representing a required value of the illumination parameter for the selected one or more light sources,
- convert the input signal to a broadcast signal for the plurality of light sources;
- enable the broadcast signal to be provided to the plurality of light sources thereby enabling the selected one or more light sources to comply with the required value of the illumination parameter As an example of such a control unit, the control unit according to the invention can comprise

- a selector for selecting the light source of the plurality of light sources, thereby enabling the selected light source to receive a broadcast signal;
- a control element for determining a required value of the illumination parameter of the selected light source and convert the required value to the broadcast signal;
- transmission means for providing the broadcast signal to the plurality of light sources, thereby controlling the illumination parameter of the selected light sources.

A particular embodiment of the control unit according to the invention can be arranged to

- select the light source of the plurality of light sources, thereby enabling the selected light source to receive a broadcast input signal;
- determine a required value of the illumination parameter of the selected light source;
- convert the required value to the broadcast signal for the light sources;
- provide the broadcast signal to the plurality of light sources, thereby controlling the selected light source to comply with the required value of the illumination parameter.

The control unit according to the invention may be applied in a lighting system (e.g. a lighting system comprising a plurality of LED fixtures). Therefore, according to a further aspect, the invention provides a lighting system comprising a central control unit for controlling a configuration of light sources and a control unit for controlling an illumination parameter of one or more light sources of the configuration of light sources, the control unit being arranged to

- select the one or more light sources of the plurality of light sources, thereby enabling the selected one or more light sources to receive a broadcast signal;
- determine a required value of the illumination parameter of the selected one or more light sources;
- convert the required value to a control signal for the central control unit, the central control unit being arranged to

- receive the control signal and convert the control signal to the broadcast signal and sent the broadcast signal to the configuration of light sources, thereby controlling the selected one or more light sources to comply with the required value of the illumination parameter.

The present invention provides a control unit for use in a lighting system comprising a plurality of light sources. Rather than addressing each light source individually with a set point (e.g. for adjusting an illumination parameter such as a colour or an intensity), the control unit according to the invention enables the control of a subset of light sources of a plurality of light sources by so-called broadcasting.

Within the meaning of the present invention, broadcasting is used to denote the transmission of a signal (e.g. a control signal) to a plurality of light sources contrary to providing a control signal to a single light source. Broadcasting such a signal to a plurality of light sources may be achieved in various ways such as e.g. using RF-communication, PLC (power line communication) or DMX.

As example of a light source as can be applied in a lighting system according to the invention, an LED fixture can be mentioned. Such an LED fixture comprises one or more LEDs and can further be provided with a power converter (e.g. a Buck converter) for providing an appropriate power to the LED or LEDs. Such an LED fixture may further comprise a controller arranged to receive an input signal representing a required illumination parameter of the LED or LEDs and control the LED or LEDs accordingly. In an embodiment, such a controller of an LED fixture may also comprise a show generator for generating a predetermined or programmable sequence of different illumination parameter settings, also referred to as scenes.

In accordance with the invention, a control unit is arranged to select of one or more of the light sources. The selection of the one or more light sources can be realised in various ways as will be explained further below. Once the selection has been realised, various ways exist to control the selected one or more light sources. A user interface, e.g. associated with the control unit can be applied to select an illumination requirement (e.g. a colour or intensity set point) for the selected one or more light sources. As such, a user interface can e.g. output a signal representing the required illumination parameter, the control unit thus being arranged to receive the signal, i.e. to receive an input signal representing a required value of the illumination parameter for the selected one or more light sources. The input signal can e.g. be in the form of a set point e.g. representing a dimming level or colour setting for the selected one or more light sources. In order to apply such a set point to the selected one or more light sources, different ways will be explained in more detail below. when a selection of the one or more light sources is made and an input signal is received by the control unit, the control unit can convert the input signal to a broadcast signal for the plurality of light sources;

The control unit according to the invention enables the broadcast signal to be provided to the plurality of light sources thereby enabling the selected one or more light sources to comply with the required value of the illumination parameter.

In an embodiment, the broadcast signal is provided by the control unit to the light sources thereby enabling the selected light sources being susceptible to receive and accept a set point whereas the non-selected light sources are arranged to e.g. disregard the set point. As such, the broadcast signal may thus enable that only the selected one or more light sources are controlled with a (e.g. user defined) set point. This can be achieved in various ways.

As an example, based upon the selection, the control unit can provide a selection signal or enable signal to either the plurality of light sources or the selected one or more light sources, the signal resulting in the one or more light sources being brought in an 'enabling mode' or mode to receive the broadcast signal. Depending on the communication interface(s) available, and the selection or enable signal itself, the signal should be sent to only to the selected one or more light sources or can be sent to the plurality of light sources.

As an alternative to the broadcast signal being provided to the light sources by the control unit, the control unit can provide a control signal to a central control unit, the central control unit subsequently providing the selection signal or enable signal to the plurality of light sources or the selected one or more light sources.

As yet another alternative, such a central control unit can also be arranged to provide the broadcast signal to the plurality of light sources (the broadcast signal e.g. comprising the user defined set point), whereby the broadcast signal is modified based on the selection thus ensuring that only the selected one or more light sources respond to the broadcast signal. As is explained in more detail below, this can be realised in various ways.

The present invention may advantageously be applied in e.g. a museum or shop where individual lighting settings per e.g. object or location are needed. Individual objects or locations are in most cases lit with a group of identical output set lighting devices, e.g. identical by colour and/or dimming level.

The subject matter of the present invention may advantageously be combined with the LED assemblies and methods for controlling a LED assembly as described in U.S. Provisional 61/037,176 incorporated herein by reference and with the subject matter of PCT/NL2008/000044, incorporated herein by reference.

BRIEF DESCRIPTION OF THE FIGURES

FIG. 1*a* schematically depicts a first embodiment of a control unit 100 according to the present invention (the control unit being represented by a dimmer). In FIG. 1*a*, the control unit 100 is arranged in a grid or network configuration with a plurality of light sources 120 (indicated in the Figure as Nodes or Fixtures). The grid or network is indicated in FIG. 1*a* by the lines 110 between the control unit 100 and the light sources 120. It should be noted that the grid or network configuration does not require the control unit and light sources to be connected by a wired network or grid. Lines 110 are merely applied to indicate that a communication is possible between the control unit 100 and the light sources. In accordance with the invention, communication between the control unit and the light sources can e.g. be realised by wireless communication such as RF-communication, PLC communication, DMX or other protocols and/or media, etc. . . . .

Figure 1A:
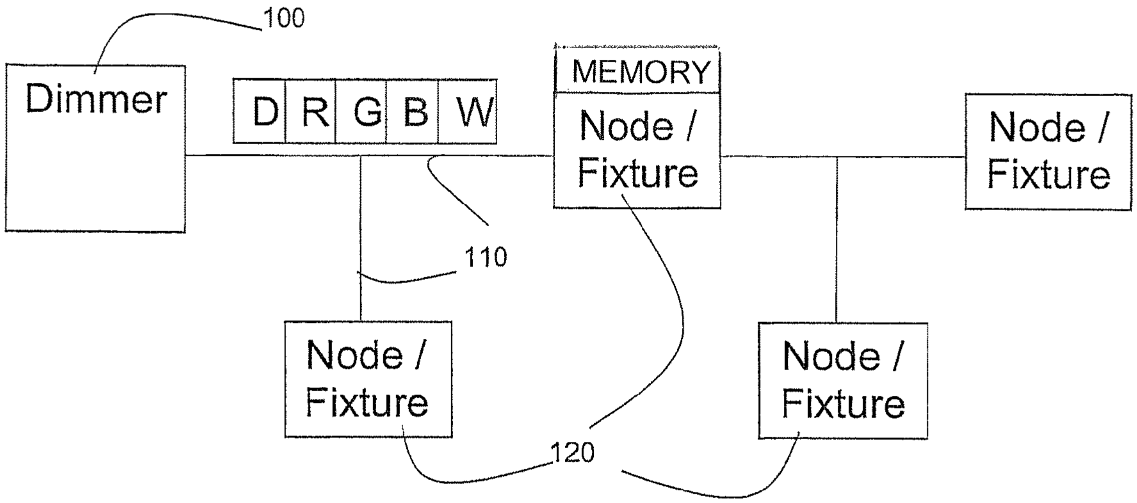
FIG. 1*a* schematically depicts a lighting system comprising a control unit according to the invention.

In accordance with the invention, the control unit is arranged to select one or more of the light sources in the network, set an illumination parameter (or adjust said parameter), e.g. in response to an input signal received from a user interface. and arrange for the required setting or adjustment of the illumination parameter of the selected light sources. When a light source (also referred to as node or fixture) is selected, a required illumination parameter of said light source can be set, e.g. by using a control element of a user interface such as a dimmer. When the parameter is set, the interface or control unit can arrange for the setting (i.e. the selected value of the illumination parameter) to be applied to the light source, e.g. by providing a signal to the selected light source or light sources. Such a signal (also referred to as a broadcast signal) can be provided to the light sources by e.g. RF-communication, PLC communication, DMX or an other communication protocol.

It should be emphasised that an illumination parameter of the light source within the meaning of the present invention should be understood as not being limited to e.g. an intensity of the light source or a colour setting of the light source but should be understood in more general terms. In particular, it may be advantageous to apply the present invention to control a number of light sources to perform a so-called light show. In this case, the control unit can be applied to select the light sources that need to perform the show, and provide a signal that enables the execution of the light show. As such, a light show (which e.g. can be considered a sequence of different setting of intensity or colour that vary in a predetermined manner) may also be considered an illumination parameter.

In the control unit according to the present invention, prior to providing a signal to the configuration of light sources to set an illumination parameter, a selection (a subset) of the light sources is made; i.e. the selection of those light sources that need a different illumination parameter. Once this is done, there is no longer a need to address the different light sources individually, the selected light source (or sources) can be addressed by a common control signal that is sent or broadcasted to all light sources but, due to the selection, will only result in a change or setting of the illumination parameter of the selected light source or sources.

By doing so, the required bandwidth for the communication from the control unit to the light sources can be reduced. It can be noted further that the step of selecting the required light sources may also be accomplished by de-selecting the sources that do not need a change in the illumination parameter.

In order to select the required light sources who's illumination parameter needs adjusting, various options exist. The control unit can e.g. comprise a user interface enabling a user to select one or more of the plurality of light sources. Such a user interface can e.g. comprise an encoder wheel for identifying the various light sources in the configuration. A selection or de-selection of the identified light source can then be made by e.g. pushing the encoder wheel or by pushing a button of the control unit or user interface.

In a further embodiment, the control unit or user interface includes a grouping feature for selecting (or de-selecting) more than one light sources. In such an arrangement, the control unit can be provided with a so-called add-to-selection key which enables a selected light source to be added to a previously made selection rather than removing the previously made selection when a new selection is made.

The user interface of the control unit of a different user interface may further be arranged to, upon application by a user, provide an input signal to the control unit, the input signal representing a required (change of an) illumination parameter of the selected one or more light sources.

In order to ensure that the required (change of an) illumination parameter is only applied by the selected light sources, various options exist;

As a first example, the control unit can provide an enable signal to the selected one or more light source thereby rendering the selected light sources susceptible to receive and process a signal representing a required (change of an) illumination parameter. Such a signal can e.g. be a DMX-type signal indicating for each of the light sources whether or not to operate in a certain operating mode. The plurality of light sources can e.g. have a daisy-chain configuration. As such, the signal can comprise a start code and an array of data bytes or frames. For a given value of the start code, the light sources receiving the signal can interpret the array of data bytes in a certain manner. Upon receipt of the signal, a light source of the plurality of light sources can interpret a certain data byte received. As such, for a given start code value, the light sources can interpret a data byte received as a command to operate in a certain mode, e.g. an 'enable mode' enabling the light source to subsequently respond to a further signal e.g. a request to set or adjust a certain illumination parameter or a 'disable mode' instructing the light source to ignore a further signal. Such a signal is schematically depicted in FIG. 1*b*. FIG. 1*b* schematically depicts an array of data bytes 150 preceded by a start code SC1. Associated with this start code SC1, the data bytes can be interpreted by the plurality of light sources to operating in either the enable mode or disable mode, e.g. corresponding to receiving either a "1" data byte or a "0" data byte.

Once the selected one or more light sources are brought in an 'enable mode' a set point, representing an value of an illumination parameter can e.g. be broadcasted (e.g. using the same DMX protocol) to the plurality of light source. Establishing that the broadcasted signal is interpreted by the light sources as a set point can be done by a predefined start code value of the broadcasted signal. Such a signal is schematically depicted in FIG. 1*c* indicating an array of data bytes 160 preceded by a different start code SC2 thereby ensuring that the data bytes received (D1, D2, . . . ) are interpreted by the selected (enabled) light sources as a set point.

So, in brief, based upon the selection, a first signal can be generated and broadcasted that enables the selected light sources and disables the not selected light sources to respond to a subsequent control signal. The broadcasted subsequent control signal can thus represent the illumination parameter in a form which can be received by the light sources (e.g. as a set point) and converted to e.g. a control signal for controlling the light source.

It will be appreciated by the skilled person that the above described steps of enabling the one or more selected light sources and broadcasting a signal to the plurality of light sources thereby providing the selected light sources with a set point, can be combined in one step: i.e. based upon the selection, the broadcasted signal can be arranged to ensure that only the selected light sources process a set point received. This can e.g. be realised in various ways:

Rather than providing an array of set points e.g. as an array of data bytes, the broadcast signal provided to the plurality of light sources can comprise a command, e.g. a particular value data byte, associated with each data byte representing a set point. As such, two data bytes are used per light source. Such a signal 180 is schematically depicted in FIG. 1*d*. The signal 180 comprises a start code SC and a number of data pairs each comprising a command data byte (C1, C2) and a data byte (D1, D2, . . . ) representing a set point. Upon receipt of a command C1, a light source can e.g. accept and process the associated data byte (D1, D2, . . . ) whereas a command C2 can result in the associated data byte to be ignored.

As an alternative, the plurality of light sources can be arranged in such manner that a certain value of a data byte is interpreted by the light source accepting it as a command to ignore the data rather than as a set point. FIG. 1*e* schematically depicts a signal 190 having such a structure. The signal 190 comprises a start code and an array of data bytes (D1, D2, . . . Di) whereby a data byte Di is e.g. ignored by the light source receiving it rather than applying it as a set point. As an example, the value for data byte Di can be chosen to correspond to a value outside the normal range applied as a set point for setting an illumination parameter of the light source.

So, based upon the selection, a broadcast signal can be manufactured comprising, as an example, an array of set points for the plurality of light sources (e.g. using a DMX protocol) whereby each set point is associated with an enable or disable command or, by using a particular value of the set point, the set point is either recognised as a set point or ignored.

It is worth noting that, when an illumination parameter of two or more light sources needs to be set or adjusted, it may be advantageous to arrange these two or more light sources in a group which can e.g. be selected in one step (by making an appropriate selection on a user interface) rather than having to select each light source of the group individually.

Similarly as described above, selected groups can be enabled or disabled to accept and process data bytes received.

Further, as will be acknowledged by the skilled person, the above mentioned principles of broadcasting a signal thereby enabling or disabling certain light sources or providing selected light sources with a set point by associating a data byte with a command code or command data byte or by the application of different start codes can be implemented in various ways: As an example, the value of the command data byte may not only indicate to the light source whether or not to ignore the associated data byte, the command data byte may also indicate the character of the associated data byte, e.g. whether the data byte should be interpreted as a dimming level (required intensity level) or a colour set or any other lighting parameter. Preferably, the command data byte proceeds the data byte representing the set point.

The control unit according to the invention (e.g. dimmer 100 in FIG. 1*a*) may advantageously be applied in a lighting system further comprising a central control unit thereby facilitating a specific task of the central control unit. As an example, where a large network or configuration of light sources is applied (e.g. a shop or museum), it may be advantageous to provide a control unit according to the invention to enable e.g. dimming of a subset of the light sources rather than having this task solely provided by the central control unit. Such a subset of light sources can e.g. be intended to illuminate part of a room or a room. It may be advantageous to have the control unit near the location that is illuminated rather than on a central location where a central control unit is applied thereby enabling A possible configuration of a control unit (such as a control unit described in accordance with FIGS. 1*a*-1*e*) according to the present invention in a lighting configuration 200 is shown in FIG. 2. In FIG. 2, a central control unit 210 is depicted as a configuration tool (as in general, one of the tasks or functionalities of the central control unit is to configure the various light sources in an individual manner, e.g. colour, intensity, arrange for a certain variation of the parameters over time to configure a light show). Each of the light sources (nodes/fixtures) 220 can be addressed by the central control unit 210 via a network bridge (bridge) 215 or the network 240. As known to the skilled person, a bridge denotes an apparatus capable of receiving/transmitting on one medium and transmitting/receiving on another different medium. Examples of such bridges are a RF-DMX bridge or a DMX-PLC bridge. Alternatively, local control units (depicted as dimmers in the FIG. 2) 230 (e.g. control units according to the invention) can be applied to select one or more of the light sources (nodes/fixtures) and provide a signal to the central control unit thereby controlling the central control unit 210 (configuration tool) to broadcast a signal to the lighting configuration thereby controlling the selected light sources. The grid or network is indicated in FIG. 2 by the lines 240 between the local control units 230, the central control unit 210 and the light sources 220. It should be noted that the grid or network configuration does not require the control units, the central control unit and the light sources to be connected by a wired network or grid. Lines 240 are merely applied to indicate that a communication is possible between the control units and the light sources. The signal broadcasted by the central control unit 210 can e.g. take the form of any of the signals as described above. Often, the illumination parameter to be controlled include an intensity level (also referred to as dimming level) and a colour (e.g. controlled by operating differently coloured light sources (e.g. LEDs) at different intensities, by e.g. varying the duty cycle at which the LEDs are operated). Such a signal controlling an intensity and colour parameter is schematically depicted in FIG. 2 by element 250, "D R G B W".

"D R G B W" as shown in FIG. 2 and following thus represents a signal as can be transmitted by the network, said signal can e.g. comprise set point for the dimming (D), red (R), green (G), blue (B) and white (W) as e.g. can be applied when the light sources comprise LEDs.

Figure 1B:
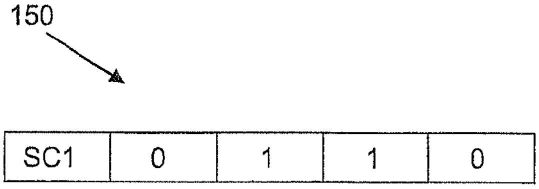
FIG. 1*b* schematically depicts a signal as can be applied to enable a selection of light sources.
Figure 1C:
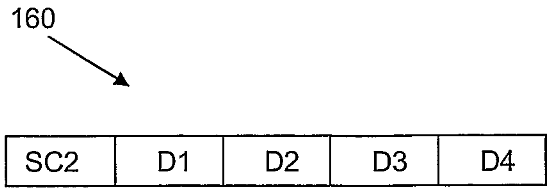
FIG. 1*c* schematically depicts a signal for modifying an illumination parameter of a selection of light sources.
Figure 1D:
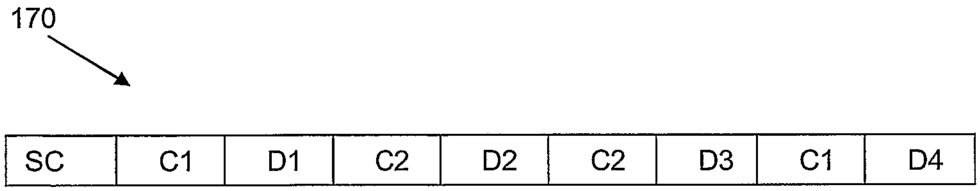
FIG. 1*d* schematically depicts a first signal as can be applied to enable a selection of light sources and to modify an illumination parameter of the selection of light sources.
Figure 1E:
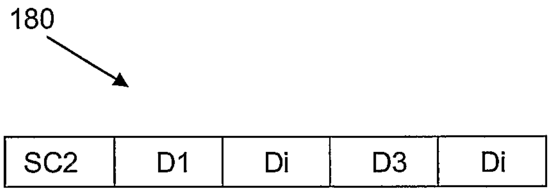
FIG. 1*e* schematically depicts a second signal as can be applied to enable a selection of light sources and to modify an illumination parameter of the selection of light sources.
Figure 2:
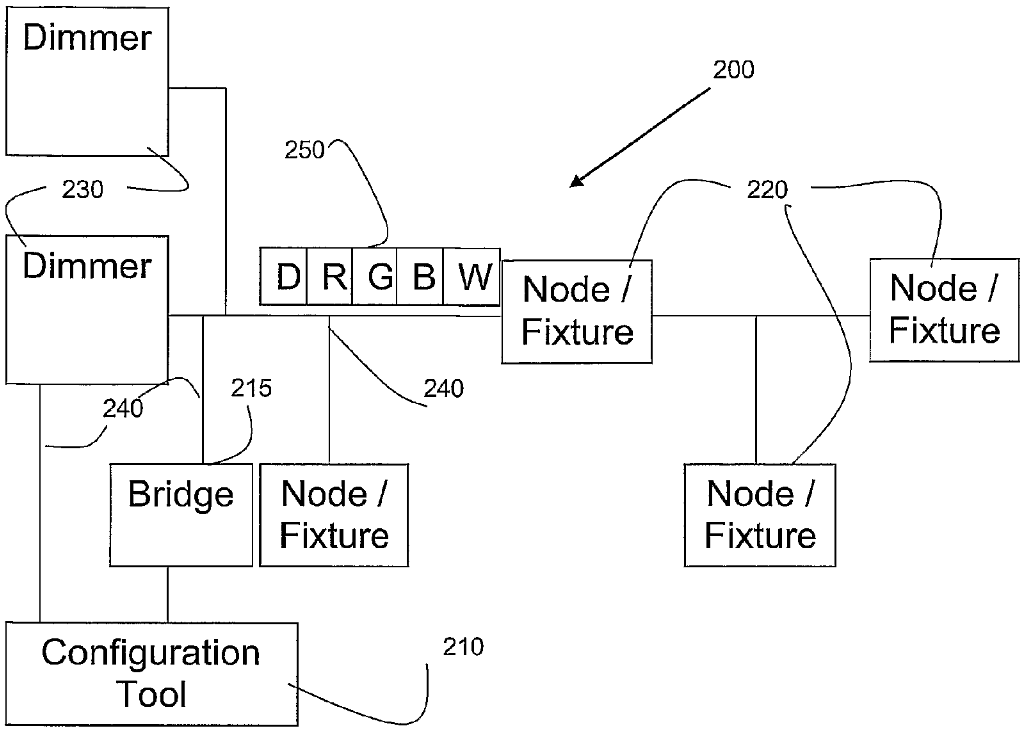
FIG. 2 schematically depicts a lighting system according to the present invention.

As also indicated in FIG. 1*a*, the network or grid 240 as indicated of the lighting configuration 200 as shown in FIG. 2 can be configured by various kinds of technology (DMX, PLC, RF, etc. . . . ) as will be appreciated by the skilled person.

Figure 3:
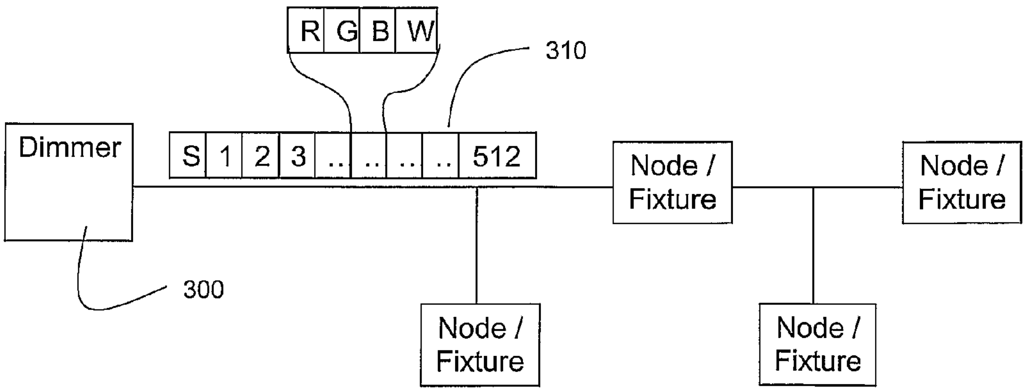
FIG. 3 schematically depicts a further embodiment of a lighting configuration comprising a control unit according to the invention.

A further embodiment of a lighting configuration comprising a control unit 300 according to the invention is shown in FIG. 3. As is further shown in FIG. 3, the (local) control unit 300 (depicted as a dimmer in the figure) is arranged to select one or more of the light sources of the configuration (said selection schematically being depicted by selector 310 indicated as "S 1 2 3 . . . 512")

Figure 4:
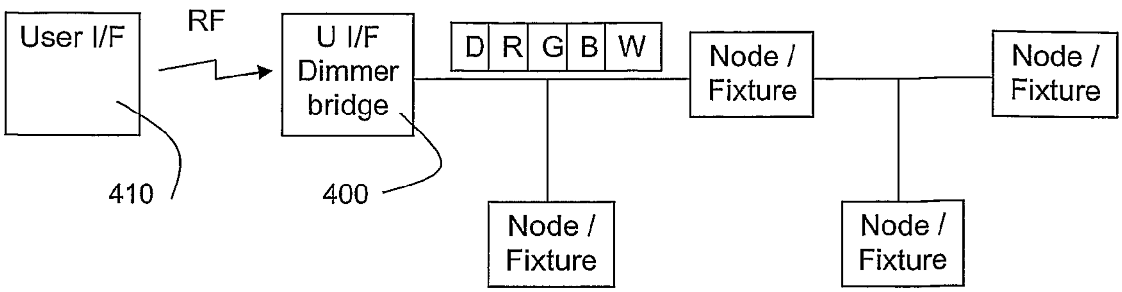
FIG. 4 schematically depicts a yet further embodiment of a lighting configuration comprising a control unit according to the invention.
Figure 5:
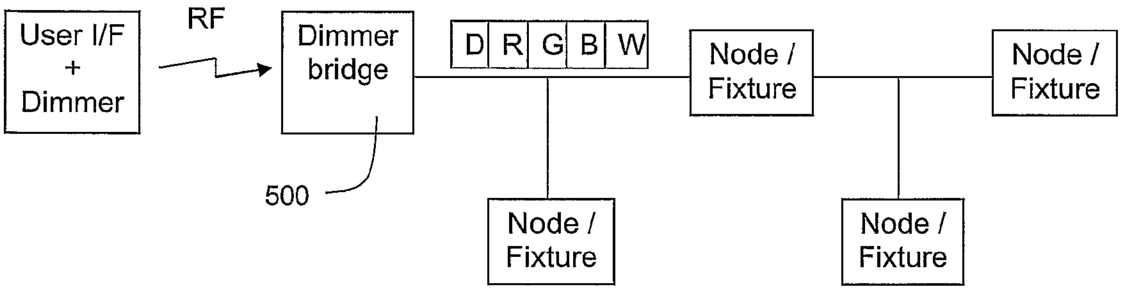
FIG. 5 schematically depicts an other embodiment of a lighting configuration comprising a control unit according to the invention.

As further specified in FIGS. 4 and 5, various configurations of the control unit according to the invention are possible. FIG. 4 e.g. schematically depicts a control unit 400 (indicated by User I/F dimmer bridge) comprising a user interface 410 (User I/F) that can communicate with e.g. a dimmer functionality of the control unit 400 via RF communication. As such, the user interface 410 of the control unit can be located close to the light sources that need control thereby enabling the user to obtain visual feedback of an operation of the user interface (e.g. changing an intensity of colour setting). FIG. 5 schematically depicts a similar arrangement whereby the control unit 500 (indicated as a dimmer bridge) combines the functionality of a bridge (as explained above) and the functionality of a control unit (e.g. for dimming purposes). As such, it will be clear to the skilled person from FIGS. 4 and 5 that the positioning of the dimming function (in general, the control function) of the control unit can be chosen e.g. depending on design parameters such as dissipation, volume requirements, EMC or noise requirements etc. . . . .

It should be emphasised that the control unit according to the present invention may be applied in various manners.

As mentioned, the control unit can be used to select a number of light sources, allow for a setting of an illumination parameter and sent (preferably by broadcast) a signal to the light sources thereby obtaining the illumination setting as described by the illumination parameter. When the control unit is applied in a lighting system comprising a central control unit (e.g. arranged to configure the lighting system), the control unit according to the present invention may equally be arranged to instruct the central control unit to provide the broadcasting of the signal enabling the setting of the illumination parameter, e.g. change an intensity or colour or a selected set of light sources or start a certain light show stored in the central control unit. The use of the control unit according to the present invention may provide an important advantage over a central control unit that needs to take care of all modifications/changes in settings of the lighting system in view of the following consideration: in most cases of architectural and retail lighting systems, the daily use of modifying an illumination parameter, (e.g. colour mixing, intensity or brightness) is limited to dimming brightness (i.e. changing the intensity of the light source or light sources). This fact even extends to the case of more complex illumination parameters such as the application of light shows (which are often dimmed to compensate for ambient environmental (day)-lighting).

It will be appreciated by the skilled person that the application of the control unit according to the invention may provide one or more of the following advantages:

The present invention may provide a better balance of central versus local intelligence or control (providing less burden on a central control unit, thereby obtaining a reduced networking bandwidth). As mentioned above, a local control unit may e.g. provide input to a central control unit or controller to change a certain illumination parameter of a light source or a selected set of light sources. In general, local control can be applied for "show" generation by each local lighting device using a broadcast parameter input of the central controller. (a local show is e.g. a set of scripting commands in a virtual machine that describe a lighting order for each individual color group as function of time or other input parameters).

As the local control unit enables a selection of the light sources to be set or adjusted, the central control unit may apply broadcasting for controlling the light sources rather than addressing the light sources individually. As such, bandwidth of the lighting system network can be reduced.

The required bandwidth during configuration and usage can be reduced to a single broadcast brightness and/or other parameter input to the locally running light show (instead of brightness, the channel may also contain a show-selection out of a play-list for example), the reduced bandwidth may enables e.g. a more cost-effective, less voluminous, less complex, and higher reliability networking and control solution (e.g. low data rate power line communication instead of RS485 with a complex DMX controller)

By enabling illumination parameters (such as brightness, a particular show, . . . ) to be set and configured (e.g. selecting which light sources should respond to a control signal) on a local level, a master controller (also referred to as central controller or control unit) does not need to know any critical information on the network topology or setting of the local lighting devices anymore and can therefore be easily made redundant, duplicated, and/or replaceable (in this respect, the present invention may advantageously be applied in combination with the subject matter described in PCT/NL2008/000044, incorporated herein by reference)

The present invention may allow for a better, simpler, more understandable and intuitive user interface closer to familiar existing traditional incandescent lighting devices such as white-dimmers, on/off switches, whereby the traditional simplicity is only extended by a means of selection during configuration (which can be done via an index via the network, or by a local switch, or a local sensor, or by selectively applying power, etc. . . . ). Also the more complex part, configuration of each lighting devices, can be hidden from the average user which then only "sees" a traditional brightness, show selection, and/or on/off control. A significant aspect in making things simple for the user is that the user is either dealing with a (set of) lighting devices (s with identical outputs) or with a global/broadcast parameter such as brightness control.

The present invention may enables a cost-effective means of local setting of a desired lighting effect by extending a master-dimmer (or configuration tool) with an appropriate wireless user-interface such that during a particular configuration of a (set of) lighting device(s) this can be performed at an appropriate location for the lighting designer.

The present invention enables the selection by a chase (e.g. by subtle timing differences caused by, inherent, daisy-chaining time-transfer delta's or by a network driven set point chase), lighting devices' or light source's light output captured by a monitoring sensor on a control device or user interface, that on the press of a user button e.g. provided on the user interface selects a particular fixture(s) for configuration.

The above described invention can e.g. be applied in lighting applications for monochrome, Planckian temperature setting or full color mixing.

In a preferred embodiment, the control unit according to the invention is further arranged to identify or characterise the configuration of the light sources as further clarified below.

The control unit as implemented according to the invention enables a separation between a configuration phase and a lighting-application phase. The configuration phase can e.g. comprise an optional discovery sub-phase followed by a (group) show generator selection sub-phase and a broadcast (limited to the selection) of show generator scripting and/or parameter settings to the selected show generators (each lighting fixture or light source e.g. having a show generator on board). A show generator can e.g. be a module in a control unit of a light source enabling an illumination parameter or parameters to the changed in a certain order thereby obtaining a certain lighting effect. As such, a show can e.g. be a sequence of a plurality of scenes, each scene corresponding to a certain setting of illumination parameters. The show generator can e.g. determine and/or control a transition between subsequent scenes thereby obtaining a certain visual effect.

The lighting application phase is then the actual use of the lighting system (e.g. comprising a plurality of light sources) where lighting is only dimmed through broadcasting for brightness (by user action or ambient sensor feedback) and/or show selection.

Configuration-phase sub-phases implementation examples:

an optional network topology discovery sub-phase that e.g. indicates to the broadcast controller (e.g. a control unit or central control unit) the number of connected local show generators (e.g. corresponding to the number of light sources in case each light source is provided with a show generator), e.g. by determining this by a network action, e.g. a timeout ping methodology or by setting this number in a master controller configuration. In a network where the order of devices is independent of the location (e.g. RF wireless or RF power line communication) this phase supports reordering according to physical location.

show generator (group) selection sub-phase that makes it possible to select a single show generator or group of show generators (e.g. corresponding to a group of light sources), This can e.g. be implemented by a next show generator button or encoder etc., or by a show generator coupled sensor feedback (e.g. optical or by a switch/button to be pressed for (de)selection), or a chase-point-click method (by making use of inherent timing differences between daisy-chained RS485 devices, or by sending out an id code with the lighting output which gets relayed via the broadcast network, etc. In this sub-phase a multitude of show generators may be selected as a group that will be treated identical in the next phase.

show generator parameters and/or settings sub-phase that defines the show to be run in a later phase.

Lighting-application phase:

in this phase a small selection of parameters (e.g. brightness or a show index # pointing into a playlist of different shows) is available for the user to control the lighting application in its usage phase.

Additional embodiments of the present invention may e.g. include:

a master show generator (or central control unit) that controls the other show generators (or local control units) or direct set point to light output, state-of-art, lighting devices may have performed a selection of multiple broadcast groups depending on channel address (e.g. channels 1-64 output a brightness dimming value, while channels 65-127 output a fixed fully on or fully off value). This enables, depending on a network channel address, a different actual show generator behaviour dependent on networking position. In an embodiment of the show generator, the show can be a combination of static values of one or more illumination parameters per light source (each light source e.g. comprising an LED or LED group) or a static colour hue or any LED characteristics (e.g. corresponding to a scene as described above).

The invention claimed is:

1. A control unit for controlling an illumination parameter of one or more light sources of a plurality of light sources, each of the plurality of light sources being switchable between a disable mode and an enable mode, and the control unit being arranged to:

select the one or more light sources of the plurality of light sources by switching only the selected one or more light sources into the enable mode, thereby to enable the one or more light sources that are selected and to disable the not selected light sources to cause only the selected one or more light sources to respond to a broadcast signal representing the required value of the illumination parameter and containing no individual addressing information for the plurality of light sources, convert the input signal to the broadcast signal for the plurality of light sources; and enable the same broadcast signal to be provided to the plurality of light sources after the one or more light sources have been selected, thereby enabling only the selected one or more light sources to comply with the required value of the illumination parameter.

2. The control unit according to claim 1 wherein the control unit further comprises a user interface arranged to, in use, enable the selection of the one or more light sources.

3. The control unit according to claim 1 wherein the step of selecting the one or more light sources comprises:

provide an enable signal to the selected one or more light sources thereby enabling the selected light source to use the broadcast signal to comply with the required value of the illumination parameter.

4. The control unit according to claim 1 wherein the step of converting the input signal to a broadcast signal comprises establishing an array of set points in accordance with the input signal, the array of set points being in correspondence with the selected one or more light sources.

5. The control unit according to claim 4 wherein the array of set points further comprises a configuration set point representing the selected one or more light sources.

6. The control unit according to claim 5 wherein the configuration set point enables the one or more light sources to apply a set point of the array of set points in order to comply with the required value of the illumination parameter.

7. The control unit according to claim 3 wherein the enable signal comprises a DMX signal.

8. The control unit according to claim 1 wherein the broadcast signal comprises a DMX signal.

9. The control unit according to claim 1 further comprising a selector for selecting the one or more light sources of the plurality of light sources.

10. The control unit according to claim 1 further comprising a control element for converting the input signal to the broadcast signal.

11. The control unit according to claim 9 wherein the selector comprises an encoder wheel.

12. The control unit according to claim 9 wherein the selector comprises a push-button enabling selecting of the light source.

13. The control unit according to claim 1 wherein the control unit is arranged to select additional light sources of the plurality of light sources thereby obtaining a group of selected light sources.

14. The control unit according to claim 1 wherein the plurality of light sources comprise an LED, a CFL, a light bulb, or a UV-LED.

15. The control unit according to claim 1 wherein the illumination parameter comprises an intensity or a colour setting.

16. The control unit according to claim 1 whereby the control unit is arranged to select the one or more light sources by application of a chase.

17. The control unit according to claim 16 whereby the chase comprises a network driven set point chase.

18. The control unit according to claim 16 further comprising a user interface comprising a monitoring sensor, the user interface enabling the selection of a particular light source when, in use, a light source's light output is captured by the monitoring sensor.

19. The control unit according to claim 1, wherein the step of selecting comprises providing a command to the selected one or more light sources to render the selected one or more light sources susceptible to comply with the broadcast signal.

20. The control unit according to claim 1, wherein the broadcast signal does not contain an identifier or identification of any of the plurality of light sources.

21. The control unit according to claim 1, wherein the broadcast signal does not contain an identifier or identification of the control unit.

22. The control unit according to claim 1, wherein the control unit is configured to switch only the selected one or more light sources into the enable mode by providing a command to the selected one or more light sources to render the selected one or more light sources susceptible to comply with the broadcast signal.

23. A lighting system comprising a central control unit for controlling a configuration of light sources and a control unit for controlling an illumination parameter of one or more light sources of the configuration of light sources, each of the one or more light sources being switchable between a disable mode and an enable mode the control unit being arranged to select the one or more light sources of the plurality of light sources by switching only the selected one or more light sources into the enable mode, receive an input signal representing a required value of the illumination parameter for the selected one or more light sources, thereby to enable the one or more light sources that are selected and to disable the not selected light sources to cause only the selected one or more light sources to respond to a broadcast signal representing the required value of the illumination parameter, and containing no individual addressing information for the plurality of light sources, and convert the input signal to a control signal for the central control unit, the central control unit being further arranged to receive the control signal and convert the control signal to the broadcast signal and provide the same broadcast signal to the configuration of light sources, thereby enabling only the one or more selected light sources to comply with the required value of the illumination parameter.

24. A lighting system comprising a central control unit for controlling a configuration of light sources and a control unit for controlling an illumination parameter of one or more light sources of the configuration of light sources, each of the plurality of light sources being switchable between a disable mode and an enable mode, and the control unit being arranged to select one or more light sources of the plurality of light sources, by switching only the selected one or more light sources into the enable mode, thereby enabling the selected one or more light sources and disabling the not selected light sources to cause only the selected one or more light sources to receive a broadcast signal containing no individual addressing information for the plurality of light sources;

determine a required value of the illumination parameter of the selected one or more light sources; and convert the required value to a control signal for the central control unit, the central control unit being further arranged to receive the control signal and convert the control signal to the broadcast signal and send the same broadcast signal to the configuration of light sources, thereby controlling only the selected one or more light sources to comply with the required value of the illumination parameter.

25. A control unit for controlling an illumination parameter of one or more light sources of a plurality of light sources, each of the plurality of light sources being switchable between a disable mode and an enable mode, and the control unit being arranged to operate in a configuration mode to select the one or more light sources of the plurality of light sources by providing a first signal to the plurality of light sources to switch only the selected one or more light sources into the enable mode, and to receive an input signal representing a required value of the illumination parameter for the selected one or more light sources, wherein the selected one or more light sources are enabled and the not selected light sources are disabled, to cause only the selected one or more light sources to respond to a broadcast signal representing the required value of the illumination parameter and containing no individual addressing information for the plurality of light sources; and the control unit being further arranged to operate in a light-application mode to convert the input signal to the broadcast signal for the plurality of light sources; and to enable the same broadcast signal to be provided to the plurality of light sources while enabling only the selected one or more light sources to comply with the required value of the illumination parameter.

26. A lighting system comprising a central control unit for controlling a configuration of light sources, each of the plurality of light sources being switchable between a disable mode and an enable mode, and a control unit for controlling an illumination parameter of one or more light sources of the configuration of light sources, the control unit being arranged to select the one or more light sources of the plurality of light sources by switching only the selected one or more light sources into the enable mode, receive an input signal representing a required value of the illumination parameter for the selected one or more light sources, thereby to enable the one or more light sources that are selected and to disable the not selected light sources to cause only the selected one or more light sources to respond to a broadcast signal representing the required value of the illumination parameter, and containing no individual addressing information for the plurality of light sources, and convert the input signal to a control signal for the central control unit, and the central control unit being further arranged to receive the control signal and convert the control signal to the broadcast signal and provide the same broadcast signal to the configuration of light sources, and each light source being arranged to receive the broadcast signal and when selected, to use the broadcast signal to comply with the required value of the illumination parameter.

27. A lighting system comprising a control unit according to claim 22, and a plurality of light sources coupled to said control unit.

28. The lighting system according to claim 27, wherein the command comprises first command data, wherein the selected one or more light sources are configured to store the first command data, wherein the selected one or more light sources further being configured to comply only with the broadcast signal when the broadcast signal complies with the first command data.

* * * * *